US006628187B2

United States Patent
Hashimoto et al.

(10) Patent No.: US 6,628,187 B2
(45) Date of Patent: Sep. 30, 2003

(54) ELECTROMAGNETIC DEVICE STRUCTURED TO RESIST CORROSION

(75) Inventors: Naoya Hashimoto, Tokyo (JP); Teruo Miyaoku, Tokyo (JP); Shiro Hasegawa, Tokyo (JP); Chiaki Sugano, Tokyo (JP); Hiromasa Ozawa, Tokyo (JP); Hirohisa Ohta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/892,846

(22) Filed: Jun. 28, 2001

(65) Prior Publication Data

US 2002/0050896 A1 May 2, 2002

(30) Foreign Application Priority Data

Oct. 26, 2000 (JP) ........................................ 2000-327225

(51) Int. Cl.⁷ .............................................. H01F 27/30
(52) U.S. Cl. ...................................... 336/198; 336/192
(58) Field of Search ........................................ 335/220

(56) References Cited

U.S. PATENT DOCUMENTS

| 2,987,656 A | * | 6/1961 | Finck et al. ................. 335/219 |
| 4,660,015 A | * | 4/1987 | Finck et al. ................. 336/192 |
| 4,731,555 A |  | 3/1988 | Torimoto et al. |
| 5,057,732 A |  | 10/1991 | Fukaya |
| 5,165,871 A | * | 11/1992 | Iwabuchi ................. 239/585.1 |
| 5,270,604 A |  | 12/1993 | Sandel et al. |
| 5,313,125 A |  | 5/1994 | Bosman et al. |
| 5,523,634 A |  | 6/1996 | Takahashi et al. |

FOREIGN PATENT DOCUMENTS

| GB | 1 533 026 A | 11/1978 |
| JP | 5-276710 | 10/1993 |

* cited by examiner

*Primary Examiner*—Elvin Enad
*Assistant Examiner*—Bernard Rojas
(74) *Attorney, Agent, or Firm*—Sughrue Mion, PLLC

(57) ABSTRACT

An electromagnetic device including an outer casing, a shaft rotatably supported by the outer casing, and a motor main body disposed inside the outer casing. The motor main body has a stator and a rotor. The stator has coils constructed by winding conducting wires onto conducting-wire spool portions of first and second bobbins. The coils are embedded in an outer molding, cores are disposed so as to cover the outer molding, and the rotor is secured to the shaft. The coils are constituted by first phase and second phase excitation coils formed by winding two of the conducting wires into unifilar windings on the conducting-wire spool portion of the first bobbin. Further, third phase and fourth phase excitation coils are formed by winding two of the conducting wires into unifilar windings on the conducting-wire spool portion of the second bobbin.

9 Claims, 9 Drawing Sheets

ELECTROMAGNETIC DEVICE STRUCTURED TO RESIST CORROSION

This application is based on Application No. 2000-327225, filed in Japan on Oct. 26, 2000, the contents of which are hereby incorporated by reference.

BACKGROUND OF THE INVENTION

1. Field of the Invention

The present invention relates to an electromagnetic device such as a stepping motor, a solenoid valve, or the like, used in an automotive continuously variable transmission, for example.

2. Description of the Related Art

FIG. 6 is an external view of a permanent-magnet stepping motor, FIG. 7 is a cross section taken along line VII—VII in FIG. 6, FIG. 8 is a cross section taken along line VIII—VIII in FIG. 7, FIG. 9 is a cross section taken along line IX—IX in FIG. 7, and FIG. 10 is a partial exploded perspective of the stepping motor in FIG. 7.

In the figures, a permanent-magnet (PM) stepping motor 1, which is immersed and used in an oil, includes: an outer casing 2 made of a resin; a tubular housing 12 made of a resin which is linked to the outer casing 2; a motor main body 3 disposed inside the outer casing 2; a shaft 4 functioning as a moveable shaft rotated by the motor main body 3; and a conversion mechanism 31 for converting rotation of the shaft 4 into rectilinear motion. Moreover, the outer casing 2 and the housing 12 constitute a cover.

The motor main body 3 includes a stator 5 secured to the outer casing 2, and a rotor 6 secured to the shaft 4. The stator 5 has: coils 7 each constructed by winding a conducting wire in which an electrically-insulating layer is formed on a copper wire surface; coil terminals 8 led out from the coils 7; connector terminals 9 connected to the coil terminals 8; and an outside connector 25 connected to the connector terminals 9. The rotor 6 has a bush 10 secured to the shaft 4, and a circumferentially-magnetized hollow cylindrical permanent magnet 11 fitted over and secured to the bush 10.

The housing 12 is fastened to the outer casing 2 by a plurality of screws 12A extending parallel to the shaft 4. A circular interfitting aperture 2a is formed in the outer casing 2, and an interfitting portion 12a for inserting into the interfitting aperture 2a is formed on the housing 12. As shown in FIG. 8, three positioning projections 12b, which protrude radially and come into contact with an inner circumferential surface of the interfitting aperture 2a, are formed on an outer circumferential surface of the interfitting portion 12a. Furthermore, an annular groove 12c is formed in a joining surface of the housing 12, where the housing 12 joins the outer casing 2.

A housing communicating aperture 12d communicating between internal and external portions of the housing 12 is disposed in a side surface portion of the housing 12. A filter 13 for catching contaminants contained in the oil is disposed in the housing communicating aperture 12d. The shaft 4 is rotatably held by a casing bearing 14 and a housing bearing 15. The housing bearing 15, which is secured inside the housing 12, is a rubber-seal type.

A rod 16 reciprocated in an axial direction of the shaft 4 by rotation of the shaft 4 is disposed at a tip portion of the housing 12. A base-end portion of the rod 16 is inserted inside the housing 12, and a tip portion of the rod 16 protrudes from the tip portion of the housing 12. A rod communicating aperture 16a communicating between the internal portion of the housing 12 and an internal portion of the rod 16 is formed in the rod 16. A sleeve 17 for guiding rectilinear motion of the rod 16, an oil seal 18 for preventing penetration of contaminants from an outer circumferential portion of the rod 16, and a ring-shaped stopper 19 for regulating progression of the rod 16 are each secured to an inner circumferential surface of the tip portion of the housing 12.

The conversion mechanism 31 includes a thread portion 4a, a guide member 20 made of a resin which is formed in the base-end portion of the rod 16 and is engaged with the thread portion 4a, and a stopper 21 made of a metal which is secured to the shaft 4 and regulates regression of the rod 16. Stopper surfaces 20b and 21a which are perpendicular to the direction of rotation of the shaft 4 are formed on the guide member 20 and the stopper 21, respectively. As shown in FIG. 9, a rotation-regulating projection portion 20a which protrudes radially and regulates rotation of the rod 16 is formed on an outer circumferential portion of the guide member 20. Consequently, the guide member 20 is displaced in an axial direction of the shaft 4 by rotation of the shaft 4. An operating member 22 made of a resin is mounted to the tip portion of the rod 16.

A construction of the stator 5 will now be explained in detail with reference to FIGS. 11 to 16.

As shown in FIG. 11, conducting wires 50 constituting the coils 7 are each formed by coating an electrically-insulating layer 52 onto a copper wire 51. As shown in FIG. 12, the coils 7 are each constructed by winding the conducting wires 50 for a predetermined number of winds into a bifilar winding (parallel winding) on a conducting-wire spool portion 53a of first and second bobbins 53A and 53B. In other words, the coils 7 are constructed by winding first and second conducting wires 50A and 50B onto each of the conducting-wire spool portions 53a together side by side in an annular shape. Then, as shown in FIGS. 13 and 14, first to third coil terminals 8A, 8B, and 8C are mounted to each of the first and second bobbins 53A and 53B, the electrically-insulating layer 52 is removed from a winding start end of the first conducting wire 50A and the winding start end of the first conducting wire 50A is wound onto a tie-off portion 8a of the first coil terminal 8A and soldered, the electrically-insulating layer 52 is removed from a winding finish end of the second conducting wire 50B and the winding finish end of the second conducting wire 50B is wound onto the tie-off portion 8a of the third coil terminal 8C and soldered, and in addition, the electrically-insulating layer 52 is removed from a winding finish end of the conducting wire 50A and a winding start end of the conducting wire 50B and the winding finish end of the first conducting wire 50A and the winding start end of the second conducting wire 50B are both wound onto the tie-off portion 8a of the second coil terminal 8B and soldered.

As shown in FIG. 15, the coils 7 wound onto the first and second bobbins 53A and 53B are embedded in an outer molding 54. Here, each of the coil terminals 8A, 8B, and 8C is folded and bent, and the tie-off portions 8a to which the end portions of the conducting wires 50A and 50B are soldered are also embedded in the outer molding 54. In addition, as shown in FIG. 16, cores 55 made of iron are disposed so as to surround the coils 7, completing the construction of the stator 5.

In the stepping motor 1 constructed in this manner, as shown in FIG. 17, the coils 7 are constituted by first phase and second phase excitation coils 7a and 7b connected in series, and third phase and fourth phase excitation coils 7c and 7d connected in series. A connection portion M1 connecting the first phase and the second phase excitation coils 7a and 7b, and a connection portion M2 connecting the third phase and the fourth phase excitation coils 7c and 7d are grounded, a voltage of +14 V being applied between a terminal S1 of the first phase excitation coil 7a and the connection portion M1, a voltage of −14 V being applied between the connection portion M1 and the terminal S2 of the second phase excitation coil 7b, a voltage of +14 V being applied between a terminal S3 of the third phase excitation coil 7c and the connection portion M2, and a voltage of −14 V being applied between the connection portion M2 and a terminal S4 of the fourth phase excitation coil 7d. Moreover, the first conducting wire 50A and the second conducting wire 50B wound onto the first bobbin 53A correspond to the first phase and the second phase excitation coils 7a and 7b, respectively, and the first conducting wire 50A and the second conducting wire 50B wound onto the second bobbin 53B correspond to the third phase and the fourth phase excitation coils 7c and 7d, respectively.

This stepping motor 1 is mounted to an automotive continuously variable transmission, for example, and the operating member 22 attached to the tip portion of the rod 16 is engaged with a link 40 which opens and closes a transmission control valve in the continuously variable transmission.

When electric power is supplied to the coil 7 through the external connector 25, the first phase to fourth phase excitation coils 7a to 7d are magnetized, rotating the rotor 6 and the shaft 4 together. The guide member 20 is engaged in the thread portion 4a on the shaft 4, and since rotation of the guide member 20 is regulated, rotation of the shaft 4 is converted into rectilinear motion of the guide member 20 and the rod 16.

The transmission control valve is opened and closed by means of the link 40 by reciprocation of the rod 16, ultimately changing the rotational velocity ratio between the drive shaft and the engine shaft.

The conventional stepping motor 1 is mounted to an automobile continuously variable transmission, for example, and is entirely immersed in the oil, which contains sulfur and organosulfur compounds. Then, the electrically-insulating layer 52 is removed from the end portions of the conducting wires 50A and 50B, and the end portions of the conducting wires 50A and 50B are wound onto the tie-off portions 8a of the coil terminals 8A, 8B, and 8C and soldered. Thus, the sulfur and organosulfur compounds in the oil permeate the outer molding 54, reaching the soldered portions of the conducting wires 50A and 50B. Because the electrically-insulating layer 52 is removed from the end portions of the conducting wires 50A and 50B and the end portions of the conducting wires 50A and 50B are wound onto the tie-off portions 8a in a single layer and soldered as shown in FIG. 18, the amount of solder 56 in the soldered portions is small. For that reason, the sulfur and the organosulfur compounds react chemically with the solder 56 in the soldered portion, corroding the solder 56. Thus, one problem has been that the sulfur and organosulfur compounds reach the copper wire 51 due to the corrosion of the solder 56, and the copper wire 51 reacts chemically with the sulfur and organosulfur compounds and corrodes, eventually causing the conducting wires 50A and 50B to break. Or because the amount of solder 56 is small, the copper wire 51 of the conducting wires 50A and 50B is not completely embedded in the solder 56, exposing a portion of the copper wire 51, and therefore another problem has been that direct chemical reactions occur between the exposed copper wire 51 and the sulfur and organosulfur compounds, corroding the copper wire 51 and causing the conducting wires 50A and 50B to break.

The sulfur and organosulfur compounds in the oil permeate the first and second bobbins 53A and 53B and the outer molding 54, and in addition permeate the electrically-insulating layer 52, reaching the copper wire 51. Then, chemical reactions occur at the surface of the copper wire 51 and organosulfur compounds are formed on the surface of the copper wire 51, giving rise to a state of decreased adhesive strength of the electrically-insulating layer 52 to the copper wire 51. In this state, damage arises in the electrically-insulating layer 52 due to interference between adjacent conducting wires 50A and 50B caused by repeated thermal expansion and thermal contraction due to the heat history of the conducting wires 50A and 50B themselves.

In the conventional example, because the coil 7 is constructed by winding the conducting wires 50A and 50B onto the conducting-wire spool portions 53a of the first and the second bobbins 53A and 53B in a bifilar winding (parallel winding), the conducting wires 50A and 50B, which have large electric potential differences, are wound side by side. Thus, yet another problem has been that when damage arises in the electrically-insulating layer 52, the chemical reactions between the copper wire 51 and the sulfur and organosulfur compounds are promoted due to the large electric potential differences between the conducting wires 50A and 50B, causing the copper wire 51 to corrode and break.

SUMMARY OF THE INVENTION

The present invention aims to solve the above problems and an object of the present invention is to provide an electromagnetic device in which wire-breakage tolerance of a conducting wire is improved.

In order to achieve the above object, according to one aspect of the present invention, there is provided an electromotive device used in an oil, the electromagnetic device including:

an outer casing;

a moveable shaft supported by the outer casing;

a bobbin disposed inside the outer casing so as to be disposed around the moveable shaft on a common axis with the moveable shaft; and a coil embedded in an outer molding, the coil being constructed by winding onto the bobbin a conducting wire in which an electrically-insulating layer is coated onto a copper wire, wherein the electrically-insulating layer is removed from an end portion of the conducting wire and the end portion of the conducting wire is wound onto a tie-off portion of a coil terminal mounted to the bobbin to constitute a wound-on portion, a solder-retaining member is mounted so as to cover the wound-on portion of the conducting wire on the tie-off portion, and the wound-on portion of the conducting wire is soldered to the tie-off portion together with the solder-retaining member.

The solder-retaining member may be a cylindrical shape disposed so as to surround the wound-on portion of the conducting wire.

The solder-retaining member may be composed of a solder-plated steel plate.

The solder-retaining member may be a conductor wire wound so as to overlap the wound-on portion of the conducting wire.

The conductor wire may be a solder-plated copper wire.

The end portion of the conducting wire from which the electrically-insulating layer is removed may be wound onto the tie-off portion in multiple layers.

According to another aspect of the present invention, there is provided an electromotive device used in an oil, the electromagnetic device including:

an outer casing;

a moveable shaft supported by the outer casing;

a bobbin disposed inside the outer casing so as to be disposed around the moveable shaft on a common axis with the moveable shaft; and a coil embedded in an outer molding, the coil being constructed by winding onto the bobbin a conducting wire in which an electrically-insulating layer is coated onto a copper wire, wherein the bobbin is constituted by first and second bobbins arranged in an axial direction of the moveable shaft, and the coil is constituted by first phase and second phase excitation coils formed by winding two strands of the conducting wire into unifilar windings on a conducting-wire spool portion of the first bobbin, and third phase and fourth phase excitation coils formed by winding two strands of the conducting wire into unifilar windings on a conducting-wire spool portion of the second bobbin.

The first phase excitation coil may be constructed by winding one strand of the conducting wire for a predetermined number of winds onto a bottom-surface side of the conducting-wire spool portion of the first bobbin, the second phase excitation coil may be constructed by winding the other strand of the conducting wire for a predetermined number of winds onto the conducting-wire spool portion of the first bobbin so as to overlap the first phase excitation coil, the third phase excitation coil may be constructed by winding one strand of the conducting wire for a predetermined number of winds onto a bottom-surface side of the conducting-wire spool portion of the second bobbin, and the fourth phase excitation coil may be constructed by winding the other strand of the conducting wire for a predetermined number of winds onto the conducting-wire spool portion of the second bobbin so as to overlap the third phase excitation coil.

The conducting-wire spool portions of the first and second bobbins may be each divided into two divided spool portions in an axial direction of the moveable shaft, and the first phase to fourth phase excitation coils may be constructed by winding one strand of the conducting wire onto each of the divided spool portions of the conducting-wire spool portions of the first and second bobbins.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

The preferred embodiments of the present invention will now be explained with reference to the drawings.

Embodiment 1

Figure 1:
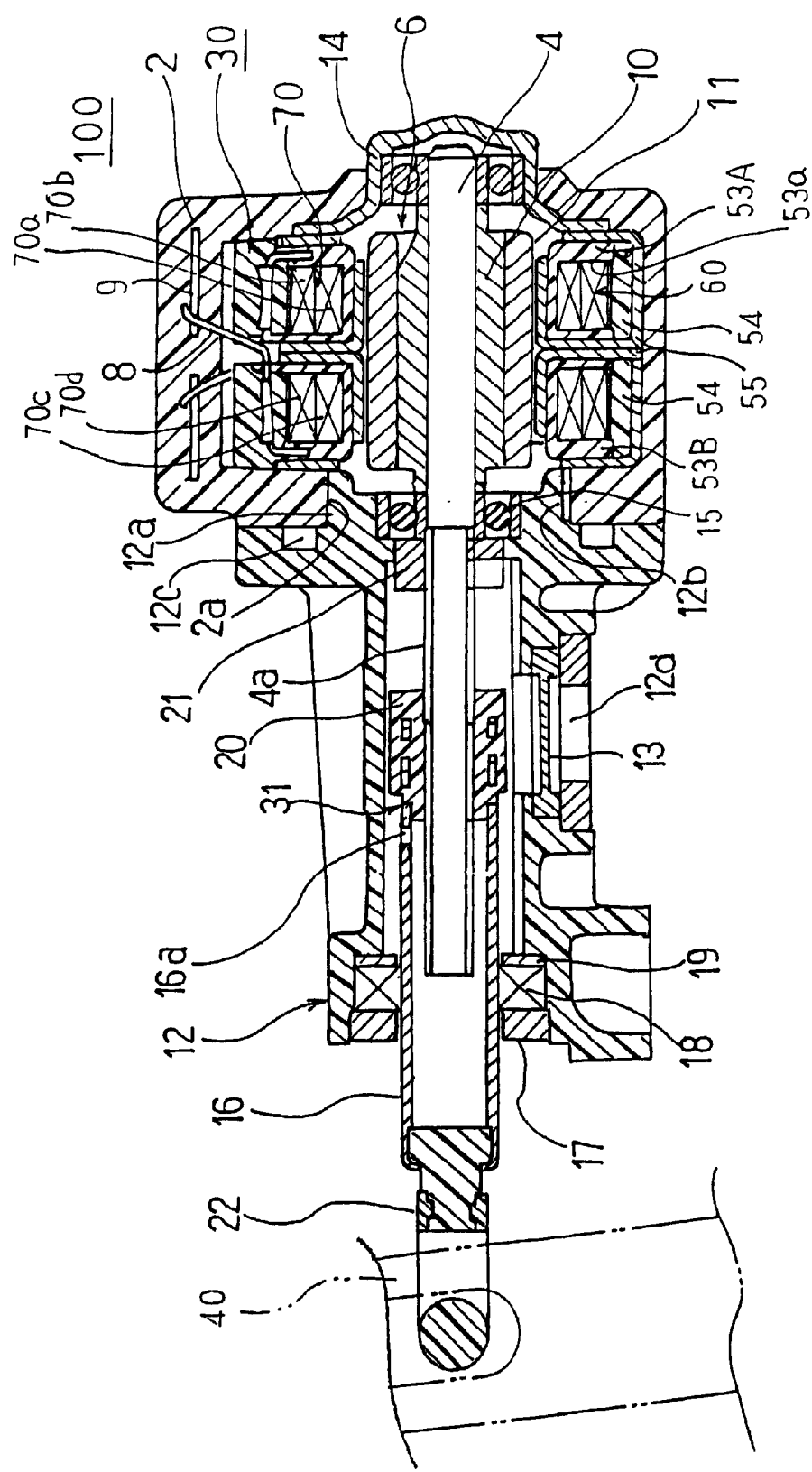
FIG. 1 is a cross section showing a stepping motor according to Embodiment 1 of the present invention.
Figure 2:
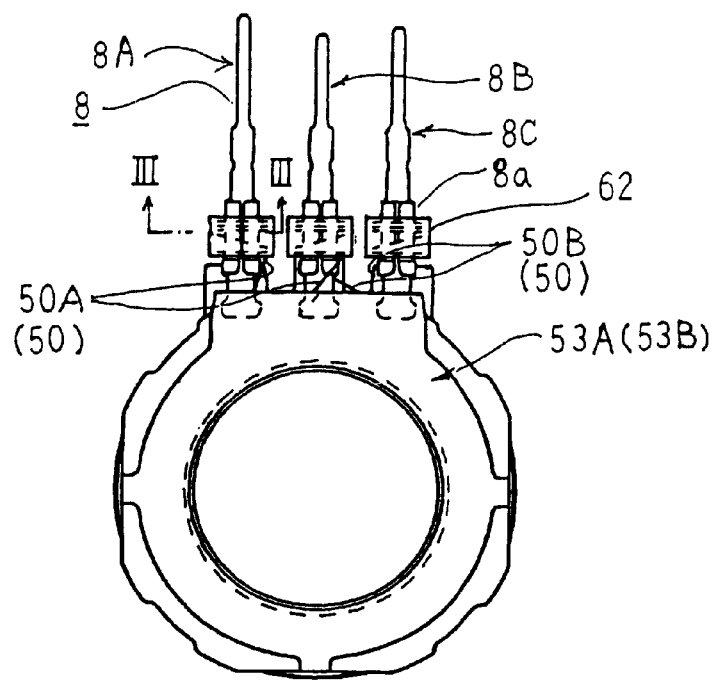
FIG. 2 is a front elevation of a bobbin explaining a wound state of a coil in a stator of the stepping motor according to Embodiment 1 of the present invention.
Figure 3:
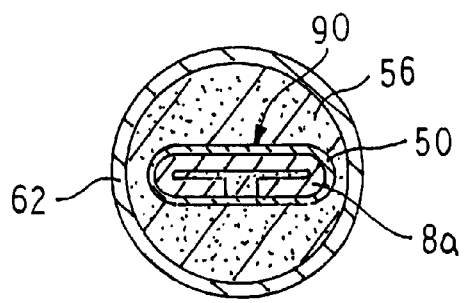
FIG. 3 is a cross section taken along line III—III in FIG. 2.

FIG. 1 is a cross section showing a stepping motor according to Embodiment 1 of the present invention, FIG. 2 is a front elevation showing a bobbin onto which a coil is wound in the stepping motor according to Embodiment 1 of the present invention, and FIG. 3 is a cross section taken along line III—III in FIG. 2. Moreover, in each of the figures, portions which are the same as or correspond to portions of the conventional electromagnetic device will be given the same numbering, and explanation thereof will be omitted.

In FIG. 1, a motor main body 30 includes a stator 60 secured to an outer casing 2, and a rotor 6 secured to a shaft 4. The stator 60 has: coils 70 each constructed by winding a conducting wire 50 in which an electrically-insulating layer 52 is formed on a surface of a copper wire 51; coil terminals 8 led out from the coils 70; connector terminals 9 connected to the coil terminals 8; and an outside connector 25 connected to the connector terminals 9.

The rotor 6 has a bush 10 secured to the shaft 4, and a circumferentially-magnetized hollow cylindrical permanent magnet 11 fitted over and secured to the bush 10.

The coils 70 are each constructed by winding the conducting wire 50 for a predetermined number of winds into a unifilar winding (serial winding) on a conducting-wire spool portion 53a of first and second bobbins 53A and 53B. In other words, the coils 70 are constructed by winding a first conducting wire 50A into an annular shape on each of the conducting-wire spool portions 53a to form first phase and third phase excitation coils 70a and 70c, and then winding a second conducting wire 50B into an annular shape on top of the first phase and the third phase excitation coils 70a and 70c on each of the conducting-wire spool portions 53a to form second phase and fourth phase excitation coils 70b and 70d. Then, the electrically-insulating layer 52 is removed from a winding start end of the first conducting wire 50A and the winding start end of the first conducting wire 50A is wound onto a tie-off portion 8a of a first coil terminal 8A, the electrically-insulating layer 52 is removed from a winding finish end of the second conducting wire 50B and the winding finish end of the second conducting wire 50B is wound onto the tie-off portion 8a of a third coil terminal 8C, and in addition, the electrically-insulating layer 52 is removed from a winding finish end of the conducting wire 50A and a winding start end of the conducting wire 50B and the winding finish end of the first conducting wire 50A and the winding start end of the second conducting wire 50B are both wound onto the tie-off portion 8a of a second coil terminal 8B. In addition, as shown in FIGS. 2 and 3, a solder-retaining member 62 formed by folding and bending a solder-plated steel plate into a cylindrical shape is mounted to each of the tie-off portions 8a of the first to third coil terminals 8A, 8B, and 8C, a solder 56 is filled inside the solder-retaining members 62, and wound-on portions of the conducting wires 50A and 50B are soldered to the tie-off portions 8a to constitute soldered joint portions.

The coils 70 wound onto the first and second bobbins 53A and 53B are embedded in an outer molding 54. Here, each of the coil terminals 8A, 8B, and 8C is folded and bent, and the tie-off portions 8a and the solder-retaining members 62 to which the wound-on portions of the conducting wires 50A and 50B are soldered are also embedded in the outer molding 54. In addition, cores 55 made of iron are disposed so as to surround the coils 70, completing the construction of the stator 60. The stator 60 is disposed around the shaft 4 so as to be coaxial with the shaft 4.

Moreover, the rest of the construction is the same as in the conventional stepping motor 1 above.

In a stepping motor 100, which is an electromagnetic device constructed in this manner, the electrically-insulating layer 52 is removed from the end portions of the conducting wires 50A and 50B constituting the coils 70, the end portions of the conducting wires 50A and 50B are wound onto each of the tie-off portions 8a of the first to third coil terminals 8A, 8B, and 8C, cylindrical solder-retaining members 62 are mounted so as to surround each of the tie-off portions 8a, the solder 56 is filled inside the solder-retaining members 62, and the wound-on portions of the conducting wires 50A and 50B are soldered to each of the tie-off portions 8a to constitute soldered joint portions. Thus, the amount of solder 56 in each of the soldered joint portions is large, preventing exposure of the copper wire 51, and the copper wire 51 is not corroded by direct chemical reaction with the sulfur and organosulfur compounds, thereby preventing the conducting wires 50A and 50B from breaking.

The sulfur and organosulfur compounds react chemically with the solder 56 in the soldered joint portion, corroding the solder 56. However, because the amount of solder 56 is large, the sulfur and organosulfur compounds are not likely to reach the copper wire 51 by corroding the solder 56. Thus, occurrences of wire breakage of the conducting wires 50A and 50B resulting from corrosion of the copper wire 51 caused by the copper wire 51 reacting chemically with the sulfur and organosulfur compounds are suppressed, improving wire-breakage tolerance of the conducting wires 50A and 50B.

Because the solder-retaining members 62 are composed of the solder-plated steel plate, solder wettability of the solder-retaining member 62 is good when the solder 56 is filled inside the solder-retaining members 62 and the solder 56 flows smoothly into the inside of the solder-retaining members 62, enabling a large amount of the solder 56 to be held in the soldered joint portions (the wound-on portions 90). Thus, because exposure of the copper wire 51 can be reliably prevented and the sulfur and organosulfur compounds can be suppressed from reaching the copper wire 51 as a result of corrosion of the solder 56, wire-breakage tolerance of the conducting wires 50A and 50B can be improved even further.

Now, the sulfur and organosulfur compounds in the oil permeate the first and second bobbins 53A and 53B and the outer molding 54, and in addition permeate the electrically-insulating layer 52, reaching the copper wire 51 wound onto the first and second bobbins 53A and 53B. Then, a chemical reaction occurs on the surface of the copper wire 51 and organosulfur compounds are formed on the surface of the copper wire 51, giving rise to a state of decreased adhesive strength of the electrically-insulating layer 52 to the copper wire 51. In this state, damage arises in the electrically-insulating layer 52 due to interference between adjacent conducting wires 50A and 50B caused by repeated thermal expansion and thermal contraction due to the heat history of the conducting wires 50A and 50B themselves.

In this stepping motor 100, the coils 70 are constructed by winding the first conducting wire 50A onto the conducting-wire spool portions 53a of the first and second bobbins 53A and 53B to form the first phase and the third phase excitation coils 70a and 70c, and in addition, winding the second conducting wire 50B on top of the first phase and the third phase excitation coils 70a and 70c to form the second phase and the fourth phase excitation coils 70b and 70d. In other words, the coils 70 are constructed by winding the first and second conducting wires 50A and 50B into a unifilar winding (serial winding) on the conducting-wire spool portions 53a. Thus, the first phase excitation coil 70a (the third phase excitation coil 70c) and the second phase excitation coil 70b (the fourth phase excitation coil 70d) are wound so as to be laminated in two layers on the conducting-wire spool portions 53, and the conducting wires 50A and 50B, which have large electric potential differences, are no longer adjacent. Thus, even if damage arises in the electrically-insulating layer 52, the chemical reaction between the copper wire 51 and the sulfur and organosulfur compounds due to the large electric potential differences between the conducting wires 50A and 50B is not promoted, thereby suppressing corrosion of the copper wire 51 and improving wire-breakage tolerance of the conducting wires 50A and 50B.

Embodiment 2

Figure 4:
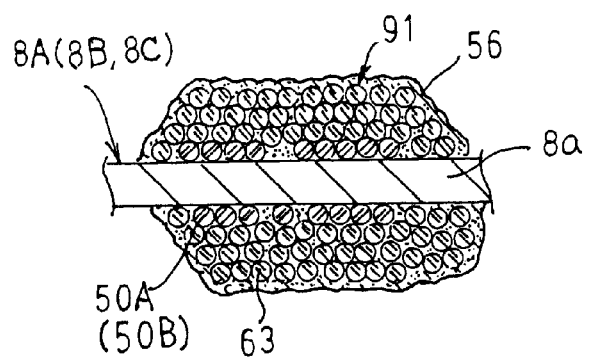
FIG. 4 is a partial cross section showing a tie-off portion of a coil terminal in a stator of a stepping motor according to Embodiment 2 of the present invention.

In Embodiment 2, as shown in FIG. 4, the electrically-insulating layer 52 is removed from the end portions of the conducting wires 50A (50B), the end portions of the conducting wires 50A (50B) are wound onto the tie-off portions 8a of each of the first to third coil terminals 8A (8B and 8C) in one layer, a conductor wire 63 composed of a solder-plated copper wire functioning as a solder-retaining member is additionally wound on top of each of the conducting wires 50A (50B) in three layers, and the solder 56 is built up on the wound-on portions of the conducting wires 50A (50B) and the conductor wires 63, soldering each of the conducting wire 50A (50B) and the conductor wire 63 onto the tie-off portions 8a.

Moreover, the rest of the construction is constructed in a similar manner to Embodiment 1 above.

According to Embodiment 2, the solder 56 seeps into the wound-on portions of the conducting wires 50A (50B) and the conductor wires 63 due to capillarity, enabling a large amount of the solder to be retained in the soldered joint portions (wound-on portions 91). Furthermore, because the conductor wire 63 is composed of the solder-plated copper wire, the solder wettability of the conductor wire 63 is improved, enabling the amount of solder retained in the soldered joint portions to be increased. Consequently, similar effects to those in Embodiment 1 above can also be achieved in Embodiment 2.

Embodiment 3

Figure 5:
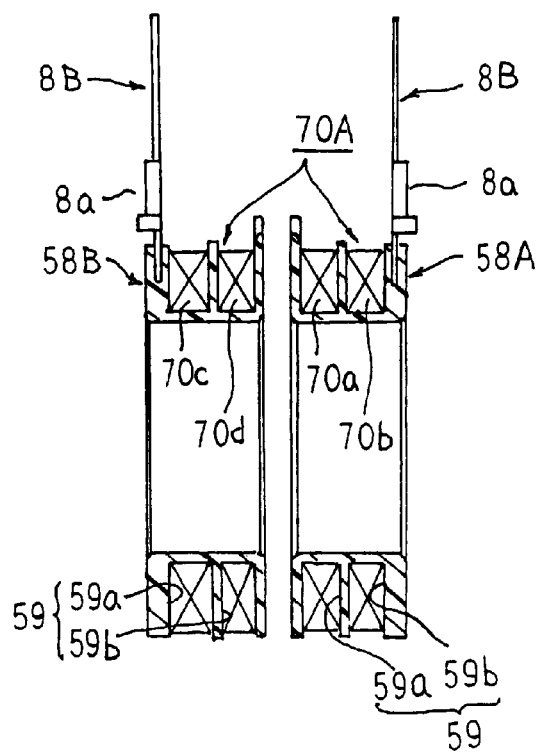
FIG. 5 is a cross section explaining a wound state of a coil in a stator of a stepping motor according to Embodiment 3 of the present invention.
Figure 6:
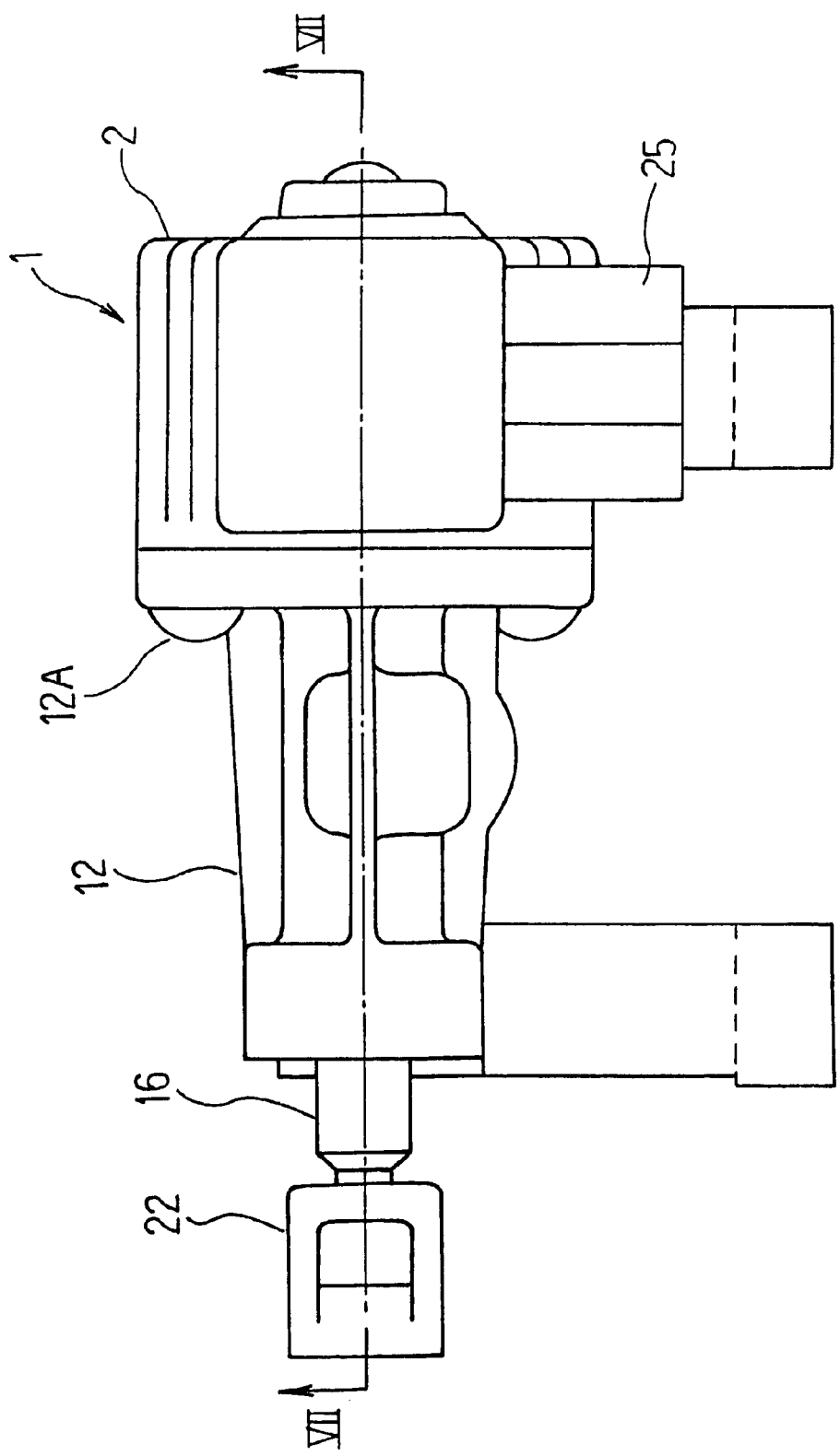
FIG. 6 is an external view of a conventional permanent-magnet stepping motor.
Figure 7:
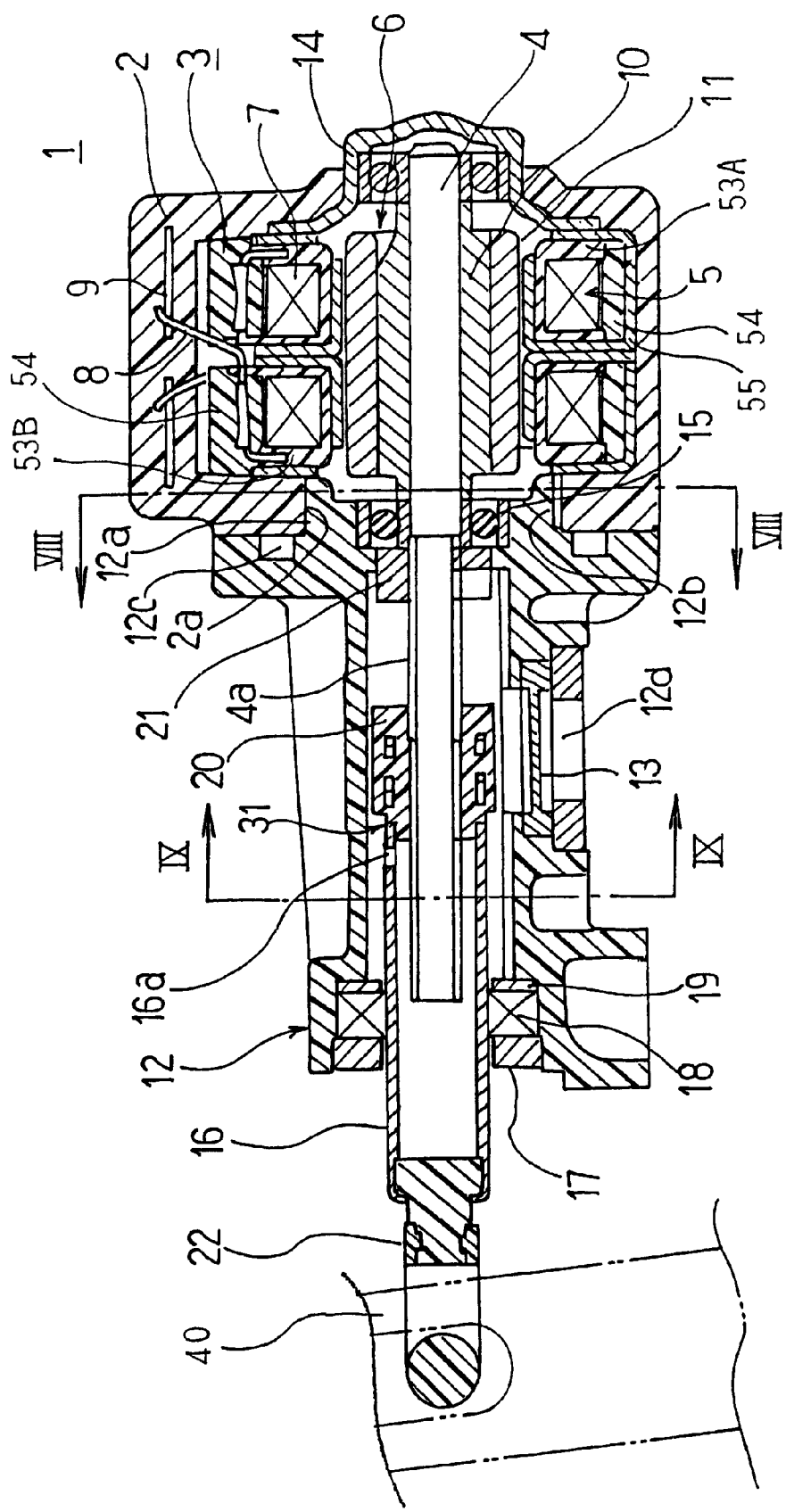
FIG. 7 is a cross section taken along line VII—VII in FIG. 6.
Figure 8:
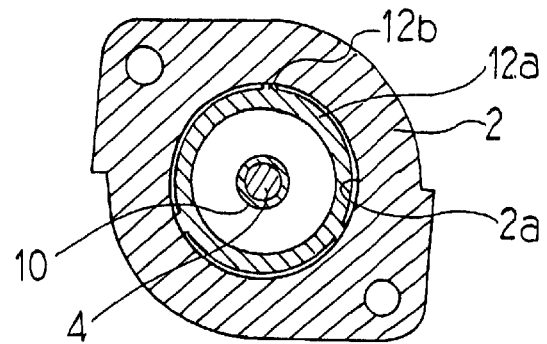
FIG. 8 is a cross section taken along line VIII—VIII in FIG. 7.
Figure 9:
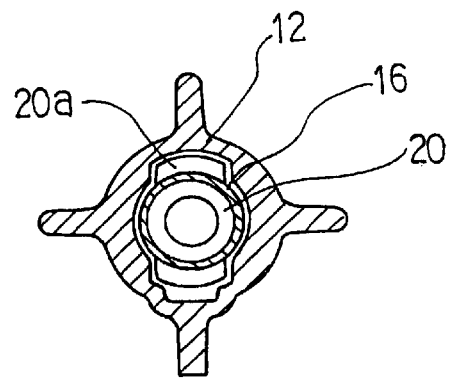
FIG. 9 is a cross section taken along line IX—IX in FIG. 7.
Figure 10:
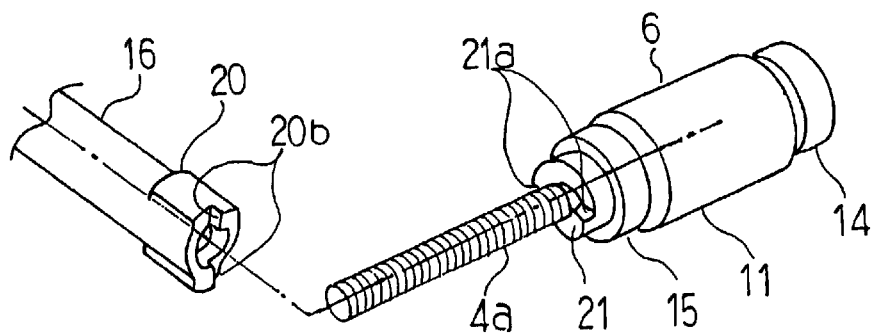
FIG. 10 is a partial exploded perspective of the stepping motor in FIG. 7.
Figure 17:
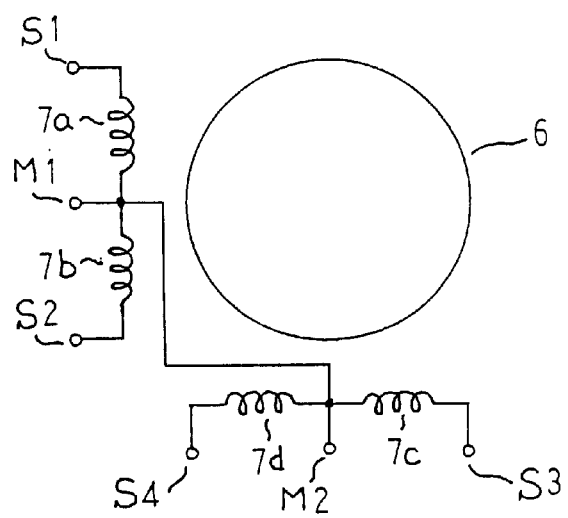
FIG. 17 is a schematic diagram showing a coil construction of the stepping motor in FIG. 7.
Figure 11:
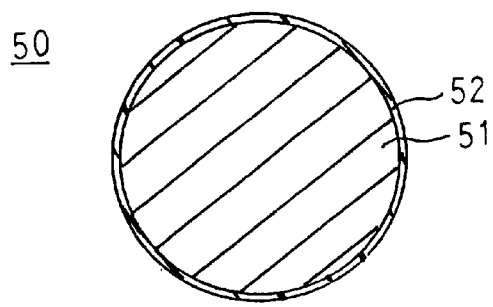
FIG. 11 is a cross section showing a conducting wire used in a coil of the stepping motor in FIG. 7.
Figure 18:
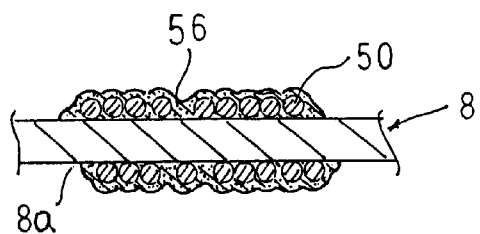
FIG. 18 is a partial cross section showing a tie-off portion of a coil terminal in the stator of the stepping motor in FIG. 7.
Figure 12:
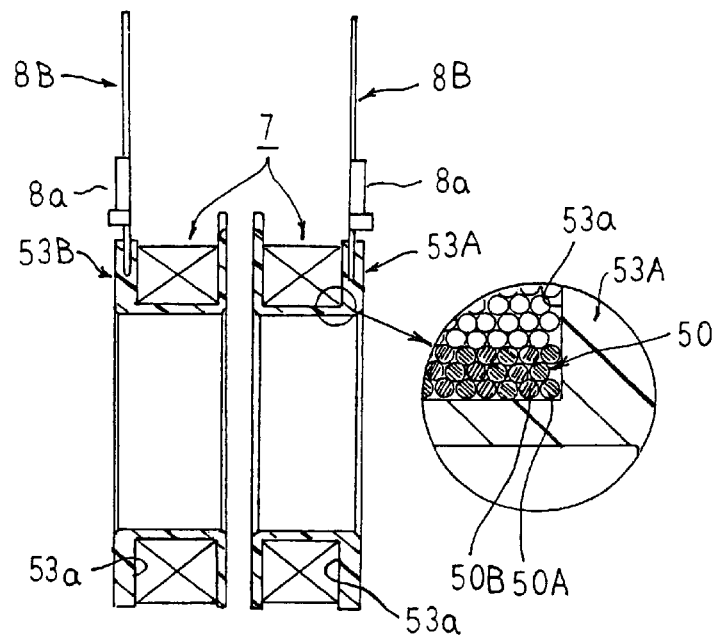
FIG. 12 is a cross section explaining a wound state of the coil in a stator of the stepping motor in FIG. 7.
Figure 13:
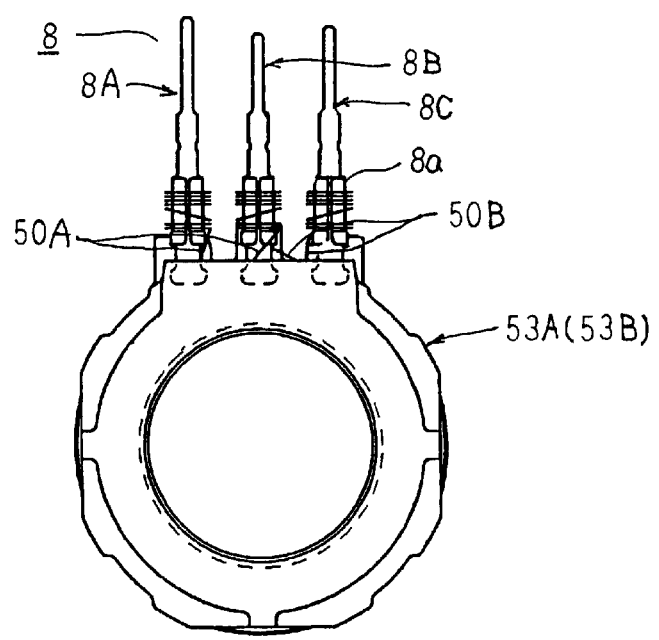
FIG. 13 is a front elevation of a bobbin explaining a wound state of the coil in the stator of the stepping motor in FIG. 7.
Figure 14:
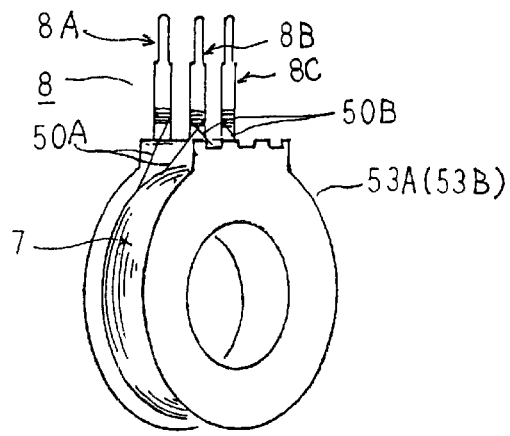
FIG. 14 is a perspective showing the wound state of the coil in the stator of the stepping motor in FIG. 7.
Figure 15:
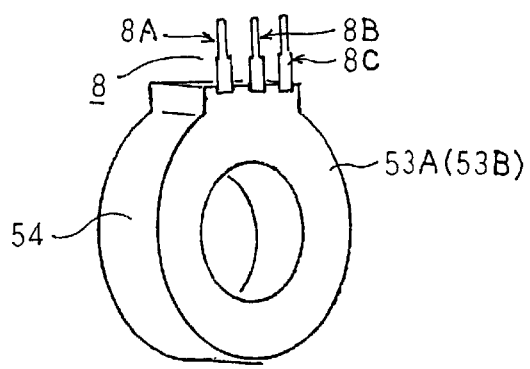
FIG. 15 is a perspective showing a molded state of a resin portion in the stator of the stepping motor in FIG. 7.
Figure 16:
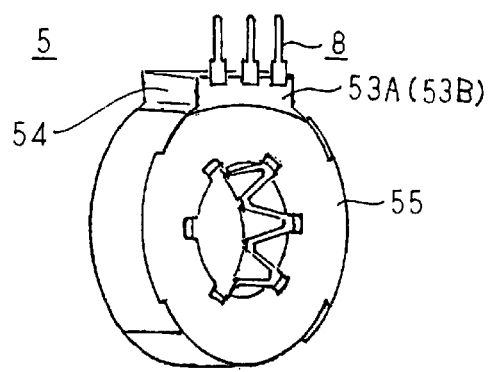
FIG. 16 is a perspective showing the stator of the stepping motor in FIG. 7.

In Embodiment 3, as shown in FIG. 5, conducting-wire spool portions 59 of first and second bobbins 58A and 58B are divided into first and second divided spool portions 59a and 59b in an axial direction of the shaft 4, the first conducting wire 50A in coils 70A is wound onto the first and second divided spool portions 59a of the first and second bobbins 58A and 58B to form the first phase and the third phase excitation coils 70a and 70c, and in addition, the second conducting wire 50B is wound onto the divided spool portions 59b to form the second phase and the fourth phase excitation coils 70b and 70d. In other words, the coil 70A is constructed by winding the conducting wires 50A and 50B into unifilar windings (serial windings) on the conducting-wire spool portions 59.

Moreover, the rest of the construction is constructed in a similar manner to Embodiment 1 above.

According to Embodiment 3, because the conducting wires 50A and 50B, which have large electric potential differences, are separated in an axial direction and wound onto the conducting-wire spool portions 59, even if damage arises in the electrically-insulating layer 52, the chemical reaction between the copper wire 51 and the sulfur and organosulfur compounds due to the large electric potential differences between the conducting wires 50A and 50B is not promoted, thereby suppressing corrosion of the copper wire 51 and improving wire-breakage tolerance of the conducting wires 50A and 50B.

Moreover, in each of the above embodiments, the conducting wires 50A and 50B are wound onto the tie-off portions 8a in one layer, but the conducting wires 50A and 50B may be wound onto the tie-off portions 8a in multiple layers. In that case, the solder 56 seeps into the wound-on portions of the conducting wires due to capillarity, allowing a large amount of the solder to be retained in the wound-on portions of the conducting wires, improving wire-breakage tolerance.

In Embodiment 1 above, the solder-plated steel plate formed by folding and bending into a cylindrical shape is used for the solder-retaining member 62, but the shape of the solder-retaining member is not limited to a cylindrical shape; it may also be an elliptical shape or a C shape. Furthermore, the material for the solder-retaining member is not limited to the solder-plated steel plate; it may also be a ceramic material or a metal material.

In each of the embodiments above, there is no particular limitation on the material for the solder 56, but wire-breakage tolerance can be further improved if lead-rich (60 wt % or more of lead) tin-lead solder is used.

Each of the above embodiments has been explained with reference to stepping motors, but the present invention is not limited to stepping motors; it may be applied to any electromagnetic device used in an oil, for example, to a solenoid valve for controlling the action of a transmission mechanism for adjusting the rotational velocity ratio between a drive shaft and an engine shaft by regulating an oil channel using a movable valve to control oil flow rate or pressure.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

This electromagnetic device of the present invention is constituted as described above. Thus, this electromagnetic device has the following effects.

According to one aspect of the present invention, there is provided an electromotive device used in an oil, the electromagnetic device including:

an outer casing;

a moveable shaft supported by the outer casing;

a bobbin disposed inside the outer casing so as to be disposed around the moveable shaft on a common axis with the moveable shaft; and a coil embedded in an outer molding, the coil being constructed by winding onto the bobbin a conducting wire in which an electrically-insulating layer is coated onto a copper wire, wherein the electrically-insulating layer is removed from an end portion of the conducting wire and the end portion of the conducting wire is wound onto a tie-off portion of a coil terminal mounted to the bobbin to constitute a wound-on portion, a solder-retaining member is mounted so as to cover the wound-on portion of the conducting wire on the tie-off portion, and the wound-on portion of the conducting wire is soldered to the tie-off portion together with the solder-retaining member, preventing wire breakage resulting from sulfur and organosulfur compounds in the oil corroding the solder and reaching the copper wire, thereby providing an electromagnetic device enabling improved wire-breakage tolerance in the conducting wire.

The solder-retaining member may be a cylindrical shape disposed so as to surround the wound-on portion of the conducting wire, enabling a large amount of the solder to be retained in the wound-on portion, thereby eliminating exposure of the copper wire and further preventing the sulfur and organosulfur compounds from reaching the copper wire due to corrosion of the solder.

The solder-retaining member may be composed of a solder-plated steel plate, improving solder wettability, thereby further increasing the amount of solder retained in the wound-on portion.

The solder-retaining member may be a conductor wire wound so as to overlap the wound-on portion of the conducting wire, whereby the solder seeps into the wound-on portion due to capillarity, thereby increasing the amount of solder retained in the wound-on portion.

The conductor wire may be a solder-plated copper wire, improving solder wettability, thereby further increasing the amount of solder retained in the wound-on portion.

The end portion of the conducting wire from which the electrically-insulating layer is removed may be wound onto the tie-off portion in multiple layers, whereby the solder seeps into the wound-on portion due to capillarity, thereby increasing the amount of solder retained in the wound-on portion.

According to another aspect of the present invention, there is provided an electromotive device used in an oil, the electromagnetic device including:

an outer casing;

a moveable shaft supported by the outer casing;

a bobbin disposed inside the outer casing so as to be disposed around the moveable shaft on a common axis with the moveable shaft; and a coil embedded in an outer molding, the coil being constructed by winding onto the bobbin a conducting wire in which an electrically-insulating layer is coated onto a copper wire, wherein the bobbin is constituted by first and second bobbins arranged in an axial direction of the moveable shaft, and the coil is constituted by first phase and second phase excitation coils formed by winding two strands of the conducting wire into unifilar windings on a conducting-wire spool portion of the first bobbin, and third phase and fourth phase excitation coils formed by winding two strands of the conducting wire into unifilar windings on a conducting-wire spool portion of the second bobbin. Thus, even if the sulfur and organosulfur compounds in the oil permeate the electrically-insulating layer, reach the copper wire, and react chemically with the copper wire, leading to decreased adhesiveness of the electrically-insulating layer and damage to the electrically-insulating layer, because the first phase and the third phase excitation coils, and the second phase and the third phase excitation coils, which have large electric potential differences, are not adjacent, chemical reactions between the copper wire and the sulfur and organosulfur compounds are not promoted, preventing wire breakage resulting from corrosion of the copper wire, thereby achieving an electromagnetic device enabling improved wire-breakage tolerance in the conducting wire.

The first phase excitation coil may be constructed by winding one strand of the conducting wire for a predetermined number of winds onto a bottom-surface side of the conducting-wire spool portion of the first bobbin, the second phase excitation coil may be constructed by winding the other strand of the conducting wire for a predetermined number of winds onto the conducting-wire spool portion of the first bobbin so as to overlap the first phase excitation coil, the third phase excitation coil may be constructed by winding one strand of the conducting wire for a predetermined number of winds onto a bottom-surface side of the conducting-wire spool portion of the second bobbin, and the fourth phase excitation coil may be constructed by winding the other strand of the conducting wire for a predetermined number of winds onto the conducting-wire spool portion of the second bobbin so as to overlap the third phase excitation coil, ensuring sufficient distance between the first phase and the third phase excitation coils, and the second phase and the third phase excitation coils, which have large electric potential differences, and chemical reactions between the copper wire and the sulfur and organosulfur compounds are not promoted, suppressing corrosion of the copper wire.

The conducting-wire spool portions of the first and second bobbins may be each divided into two divided spool portions in an axial direction of the moveable shaft, and the first phase to fourth phase excitation coils may be constructed by winding one strand of the conducting wire onto each of the divided spool portions of the conducting-wire spool portions of the first and second bobbins, ensuring sufficient distance between the first phase and the third phase excitation coils, and the second phase and the third phase excitation coils, which have large electric potential differences, and chemical reactions between the copper wire and the sulfur and organosulfur compounds are not promoted, suppressing corrosion of the copper wire.

What is claimed is:

1. An electromotive device used in an oil, said electromagnetic device comprising:

an outer casing;

a moveable shaft supported by said outer casing;

a bobbin disposed inside said outer casing so as to be disposed around said moveable shaft on a common axis with said moveable shaft; and a coil embedded in an outer molding, said coil being constructed by winding onto said bobbin a conducting wire in which an electrically-insulating layer is coated onto a copper wire, wherein said electrically-insulating layer is removed from an end portion of said conducting wire and said end portion of said conducting wire is wound onto a tie-off portion of a coil terminal mounted to said bobbin to constitute a wound-on portion, a solder-retaining member is mounted so as to cover said wound-on portion of said conducting wire on said tie-off portion, and said wound-on portion of said conducting wire is soldered to said tie-off portion together with said solder-retaining member.

2. The electromagnetic device according to claim 1 wherein said solder-retaining member is a cylindrical shape disposed so as to surround said wound-on portion of said conducting wire.

3. The electromagnetic device according to claim 2 wherein said solder-retaining member is composed of a solder-plated steel plate.

4. The electromagnetic device according to claim 1 wherein said solder-retaining member is a conductor wire wound so as to overlap said wound-on portion of said conducting wire.

5. The electromagnetic device according to claim 4 wherein said conductor wire is a solder-plated copper wire.

6. The electromagnetic device according to claim 1 wherein said end portion of said conducting wire from which said electrically-insulating layer is removed is wound onto said tie-off portion in multiple layers.

7. An electromotive device used in an oil, said electromagnetic device comprising:

an outer casing;

a moveable shaft supported by said outer casing;

a bobbin disposed inside said outer casing so as to be disposed around said moveable shaft on a common axis with said moveable shaft; and a coil embedded in an outer molding, said coil being constructed by winding onto said bobbin a conducting wire in which an electrically-insulating layer is coated onto a copper wire, wherein said bobbin is constituted by first and second bobbins arranged in an axial direction of said moveable shaft, and said coil is constituted by first phase and second phase excitation coils formed by winding two strands of said conducting wire into unifilar windings on a conducting-wire spool portion of said first bobbin, and third phase and fourth phase excitation coils formed by winding two strands of said conducting wire into unifilar windings on a conducting-wire spool portion of said second bobbin.

8. The electromagnetic device according to claim 7 wherein:

said first phase excitation coil is constructed by winding one strand of said conducting wire for a predetermined number of winds onto a bottom-surface side of said conducting-wire spool portion of said first bobbin;

said second phase excitation coil is constructed by winding the other strand of said conducting wire for a predetermined number of winds onto said conducting-wire spool portion of said first bobbin so as to overlap said first phase excitation coil;

said third phase excitation coil is constructed by winding one strand of said conducting wire for a predetermined number of winds onto a bottom-surface side of said conducting-wire spool portion of said second bobbin; and said fourth phase excitation coil is constructed by winding the other strand of said conducting wire for a predetermined number of winds onto said conducting-wire spool portion of said second bobbin so as to overlap said third phase excitation coil.

9. The electromagnetic device according to claim 7 wherein:

said conducting-wire spool portions of said first and second bobbins are each divided into two divided spool portions in an axial direction of said moveable shaft; and said first phase to fourth phase excitation coils are constructed by winding one strand of said conducting wire onto each of said divided spool portions of said conducting-wire spool portions of said first and second bobbins.

* * * * *